Dec. 13, 1938.    W. T. MURDEN    2,140,091
ANTIFRICTION BEARING AND SEAL
Filed Dec. 20, 1935
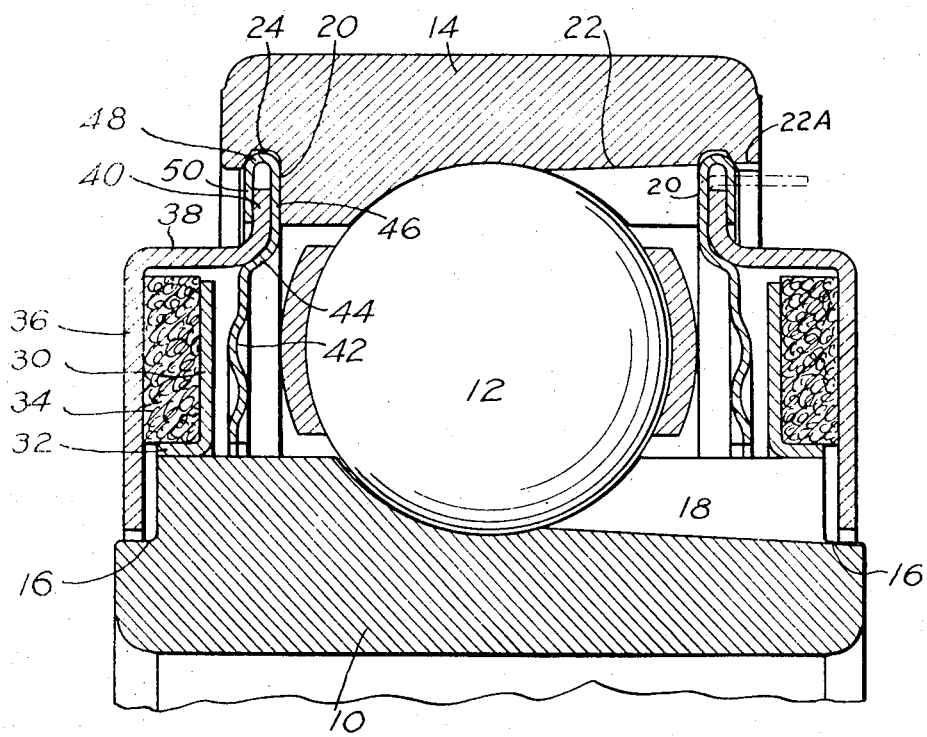
FIG. 1
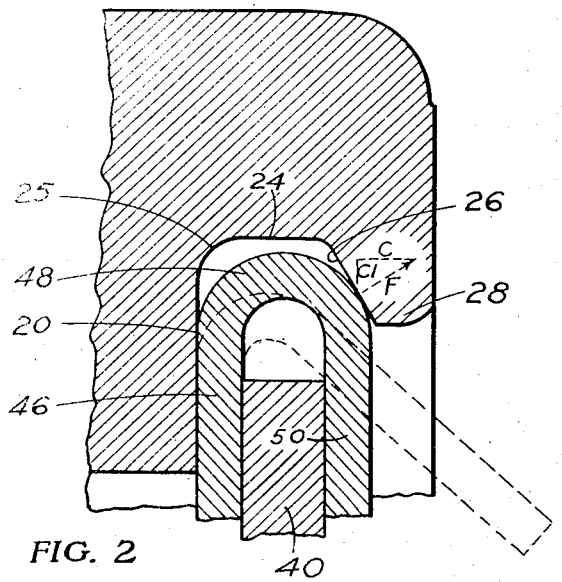
FIG. 2
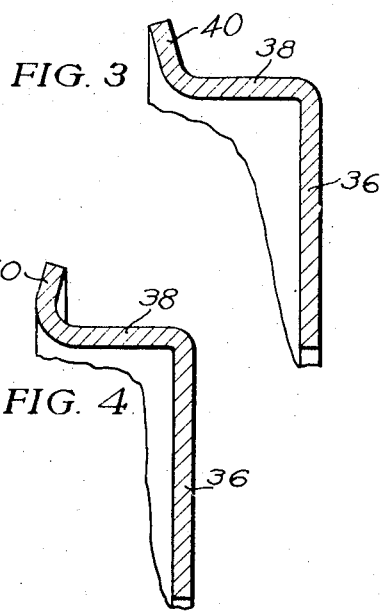
FIG. 3
FIG. 4
INVENTOR:
WILLIAM T. MURDEN,
BY Gales P. Moore
HIS ATTORNEY.

Patented Dec. 13, 1938

2,140,091

UNITED STATES PATENT OFFICE 2,140,091

ANTIFRICTION BEARING AND SEAL

William T. Murden, Bristol, Conn., assignor to General Motors Corporation, Detroit, Mich., a corporation of Delaware Application December 20, 1935, Serial No. 55,418

9 Claims. (Cl. 286—5)

This invention relates to antifriction bearings and seals and comprises all of the features of novelty herein disclosed. An object of the invention is to provide improved means for attaching a seal or shield to a bearing race ring or the like. More specifically the object is to provide a construction whereby attaching of the seal will minimize the tendency to distort it or its holding member as when a sealing washer is expanded into a holding groove. Another object is to provide an improved construction wherein two sealing washers may be firmly secured together and to a holding member.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a transverse sectional view of a sealed-up bearing.

Fig. 2 is an enlarged sectional view of a portion of the bearing ring and seal illustrating the nature of the force and its components created in the contacting parts for holding the parts together.

Figs. 3 and 4 are transverse sectional views showing alternative forms of conical flanges formed initially on one of the sealing washers.

The numeral 10 indicates an inner race ring having a raceway groove for rolling elements herein shown as balls 12 running in a raceway groove of an outer race ring 14. The inner race ring preferably has peripheral notches 16 at the ends and, in the case of a loading groove bearing, a loading groove 18 extends out from the raceway to the corresponding notch 16. The outer race ring has a deep internal shoulder 20 at each end and a loading groove 22 runs out from the raceway to one of these shoulders. Beyond the shoulder 20, each end of the race ring has an internal peripheral groove 24. One side wall of the groove near the bottom may be curved as indicated at 25 but the other side wall is a straight or conical surface 26 which preferably makes an angle of about sixty degrees with the axis of the bearing. Beyond the groove, the race ring has an overhanging lip 28 which, at the loading groove end of the bearing as indicated in Fig. 1, has a transverse groove 22A forming a continuation of the loading groove 22.

The seal comprises an angled washer 30 having a flange 32 pressed on the inner race ring 10 and forming a seat for a sealing ring 34 of felt or the like. The sealing ring 34 is contained in a chamber comprising a pair of dished washers or closure plates which are secured together and to the outer race ring. One washer 36 is preferably of steel and has a side wall 36, a cupped portion 38 and an outwardly extending flange 40 which may be initially conical as indicated in Figs. 3 and 4. The other washer 42 is much thinner and is preferably of aluminum. Its inner portion is preferably wavy with a dished portion engaging the cooperating washer at 44 while its outer portion comprises a straight or flat wall 46, a rounded bead 48 and a terminal flap 50. The outer portion can accordingly be easily bent or displaced while the wavy inner portion resists lateral displacement. The wall 46 abuts against the shoulder 20 while the bead 48 clears, or has no pressure contact with, the bottom of the groove 24 but bears forcibly against the inclined side wall 26. The flap 50 engages the outside of the flange 40 thus securing the two washers together at their peripheries, and the bending of this flap into a fold also expands the bead 48 into its groove.

As shown in Fig. 2, the rounded bead 48 clears the bottom of the groove 24 but is jammed between the shoulder 20 and the conical wall 26 of the groove, the wall 26 being inclined steeply to the axis of the bearing so that the groove gradually widens from the bottom. The reaction thus produces a force F which has its greatest component C axially of the bearing while only a small component C1 is radial. Hence there is little tendency of the washers to distort or throw the outer race ring out of round as compared to washers which are expanded wholly in a radial direction to bottom against a holding groove. Also there is a secure gripping of the flange 40 due to the large axial component C of the force F. The wavy form of the wall 42 provides rigidity against endwise or axial displacement and so prevents distortion during the clenching operation. Contact of this wall with adjacent relatively rotatable parts is thus prevented and clearances are maintained. Radially the wall is weakened so that there is less tendency to distort the race ring.

In assembling the parts of the seal, the washer wall 46 is abutted against the shoulder 20, the flap 50 then extending axially as indicated by broken lines in Fig. 1 and then the angled washer 30 and sealing ring 34 are placed on the inner race ring. Next the dished washer 36 is put on with its flange 40 abutting against the wall 46. The flap 50 is then bent around the outer edge of the flange 40, the flap passing through the dash-line position indicated in Fig. 2 as the bead 48 is expanded into its holding groove. When the flange 40 is initially conical as indicated in Figs. 3 and 4, it is straightened out by the clenching pressure but there remains in the flange some inherent tendency to regain its conical shape. This is of advantage in preventing relative turning of the washers because the flange tends to wedge itself between the wall 46 and the flap 50.

I claim:

1. In a device of the character described, a ring having a peripheral holding groove with a side wall steeply inclined to the axis of the ring and at a smaller inclination to the opposite side wall to cause the groove to widen gradually from the bottom, and a closure plate jammed laterally between and in pressure engagement with both of the side walls and out of pressure contact with the bottom of the groove whereby a larger component of pressure is exerted axially on the ring than radially thereof and the tendency of the closure plate to distort the ring radially is minimized; substantially as described.

2. In a device of the character described, a ring having a peripheral holding groove with a side wall steeply inclined to the axis of the ring, a closure plate having a folded portion jammed laterally in the groove but out of pressure contact with the bottom of the groove, and a second closure plate having a portion inserted in the fold, and the fold having pressure engagement with the inclined side wall of the groove and reacting against said inserted portion to grip the latter tightly in the fold and secure the plates together; substantially as described.

3. In a device of the character described, a ring having a peripheral holding groove, an inner closure plate and an outer closure plate, one of said plates having a portion bent around the periphery of the other plate and in holding engagement with the groove, the plates having side walls spaced apart to form a sealing chamber, and one of said side walls being thinner than the other and of wavy form in radial cross section to diminish its radial expansive force against the ring; substantially as described.

4. In a device of the character described, a ring having an internal holding groove, and a closure plate of ductile metal expanded into the groove but out of pressure contact with the bottom of the groove, said groove and closure plate having portions in pressure engagement and relatively inclined at a steep angle with respect to the axis of the ring whereby a large component of the holding pressure is exerted axially of the ring instead of radially to minimize radial stretching of the ring; substantially as described.

5. In a device of the character described, a ring having a peripheral holding groove with a side wall steeply inclined to the axis of the ring and at a smaller inclination to the opposite side wall to make the groove widen gradually from the bottom, a closure plate having a peripheral portion in pressure engagement with both of the side walls and out of pressure contact with the bottom of the groove, and the closure plate having a wavy side wall extending away from the ring; substantially as described.

6. In a device of the character described, an inner closure plate and an outer closure plate, one of the plates having a folded portion bent around a peripheral flange of the other plate, the peripheral flange being initially conical and flattened out by the folding of the one plate around it whereby the tendency of the flange to regain its initial shape maintains a pressure against the folded plate; substantially as described.

7. In a device of the character described, a ring having a peripheral holding groove, a closure plate having a folded portion in holding engagement with the groove, a second closure plate having a peripheral flange clamped in the fold and deflected from an initial position thereby, and said flange having inherent tendency to regain its initial position and deflect laterally of the fold to maintain pressure with opposite walls of the folded portion; substantially as described.

8. In a device of the character described, a ring having a peripheral holding groove with a side wall steeply inclined to the axis of the ring, the groove having a co-operating side wall in opposition to the steeply inclined side wall and forming therewith a groove which widens gradually from the bottom, and a closure plate wedged laterally between the side walls of the groove and out of pressure contact with the bottom of the groove, the wedging engagement of the closure plate with the side walls creating a lateral holding pressure which is exerted substantially axially of the ring whereby the tendency to radially distort the ring is minimized; substantially as described.

9. In a device of the character described, a ring having a peripheral holding groove with at least one side wall steeply inclined to the axis of the ring and at a smaller inclination to the opposite side wall to make the groove gradually widen from the bottom, a closure plate having a folded portion jammed laterally between the side walls of the groove and out of pressure contact with the bottom of the groove, a second closure plate having a peripheral flange clamped in the fold, the folded portion reacting between the inclined side wall and the peripheral flange to grip the latter in the fold, and the flange being initially conical with inherent tendency to regain its initial shape to thereby wedge itself between the walls of the fold; substantially as described.

WILLIAM T. MURDEN.